United States Patent
Shie et al.

(10) Patent No.: US 9,129,143 B2
(45) Date of Patent: Sep. 8, 2015

(54) FINGER SENSING STRUCTURE FOR CAPACITIVE FINGERPRINT RECOGNITION IC

(71) Applicant: Image Match Design Inc., Hsinchu (TW)

(72) Inventors: Jin-Shown Shie, Hsinchu County (TW); Ting-Sing Wang, Hsinchu County (TW)

(73) Assignee: IMAGE MATCH DESIGN INC., Hsinchu (TW)

( * ) Notice: Subject to any disclaimer, the term of this patent is extended or adjusted under 35 U.S.C. 154(b) by 0 days.

(21) Appl. No.: 14/304,342

(22) Filed: Jun. 13, 2014

(65) Prior Publication Data

US 2014/0369574 A1    Dec. 18, 2014

(30) Foreign Application Priority Data

Jun. 14, 2013   (TW) ............................. 102121060 A (51) Int. Cl.
*G06K 9/20*    (2006.01)
*G06K 9/00*    (2006.01)

(52) U.S. Cl.
CPC ................................... *G06K 9/0002* (2013.01)

(58) Field of Classification Search
None
See application file for complete search history.

(56) References Cited

U.S. PATENT DOCUMENTS 5,940,526 A * 8/1999 Setlak et al. .................. 382/124
6,483,931 B2 * 11/2002 Kalnitsky et al. ............. 382/124

FOREIGN PATENT DOCUMENTS

CN    102682271 A *  9/2012   ............... G06K 9/00

OTHER PUBLICATIONS

Machine translation of Chinese patent publication CN 102682271 A, to inventors Xia et al., published on Sep. 19, 2012, pp. 1-8.*

* cited by examiner

*Primary Examiner* — Brian P Werner
(74) *Attorney, Agent, or Firm* — Muncy, Geissler, Olds & Lowe, P.C.

(57) ABSTRACT

A finger sensing structure for a capacitive fingerprint recognition IC is provided here. The structure comprises a finger sensing metal layer with fish bone shape. When fingers approach or touch the surface of the capacitive fingerprint recognition IC, capacitive sense is induced between the fingers and the metal patterned layer to wake up the IC. Before the fingers approach or touch the IC, the IC is hibernated; once the fingers are detected, the IC is woken up. The metal patterned layer can reduce energy consumption of the IC especially for portable fingerprint recognition IC.

8 Claims, 8 Drawing Sheets

FINGER SENSING STRUCTURE FOR CAPACITIVE FINGERPRINT RECOGNITION IC

BACKGROUND OF THE INVENTION

1. Field of the Invention

The present invention is related to structure of a finger sensing device of a capacitive fingerprint recognition the integrated circuit (IC), particularly to a capacitive fingerprint recognition IC turned on while finger approach or touch.

2. Description of the Prior Art

The higher requests of privacy, information security and property safety for human being give rise to the technology of biological recognition, which is major aimed to select and confirm the object with correct identity from numerous objects. Particular physiological features of human being, such as fingerprint, face, iris, voice and the like are mainly applied in technology of biological recognition. In comparison to recognition by iris, fingerprint has wider application due to non-invasive property, easily for detection, lower equipment cost and threshold.

Capacitive sensing technology has most prospect in various technology of fingerprint recognition because of the sensing elements may integrate by the integrated circuit (IC) chip and comprise high component density and easily for encapsulation.

However, conventional fingerprint elements or devices are necessary to keep in standby status to recognize user's identity at any times, so as the power consumption is considerable and easy to run out of power is inconvenient, particularly to portable fingerprint recognition device.

SUMMARY OF THE INVENTION

The present invention provides a finger sensing structure for a capacitive fingerprint recognition integrated circuit (IC), comprises a finger sensing metal layer with fish bone shape. When fingers approach or touch the surface of the capacitive fingerprint recognition IC, capacitive sense is induced between the fingers and the finger sensing metal layer to wake up the IC. Before the fingers approach or touch the IC, the IC is hibernated; once the fingers are detected, the IC is woken up. The finger sensing metal layer may reduce energy consumption of the IC, especially for portable fingerprint recognition IC.

To solve problems of the prior art, an embodiment of the present provides a finger sensing structure for a capacitive fingerprint recognition IC, comprises a plurality of sensing electrodes, a capacitive sensing layer, a finger sensing metal layer, a common conductive layer, a signal processing circuit, an insulating layer and a protecting layer. The plurality of sensing electrodes form an array to define a sensing area; the capacitive sensing layer covers the plurality of sensing electrodes; the finger sensing metal layer disposes on the capacitive sensing layer and includes a plurality of fishbone-like structures, wherein the plurality of fishbone-like structures are distributed between gaps of the plurality of sensing electrodes or distributed in peripheries of the plurality of sensing electrodes; the common conductive layer connects to the plurality of fishbone-like structures and surrounds the sensing area to transfer signals; the signal processing circuit disposes under and electrical connects to the plurality of sensing electrodes; the insulating layer disposes between the plurality of sensing electrodes and the signal processing circuit; the protecting layer covers the capacitive sensing layer and the finger sensing metal layer. Each of the plurality of fishbone-like structures at least comprises a ridge; the ridge is alternately arranged with the plurality of sensing electrodes in a first direction of the array of the plurality of sensing electrodes, and the ridge is extended along a second direction, which is perpendicular to the first direction of the array of the plurality of sensing electrodes; and at least one end of the ridge is connected to the common conductive layer.

According to another embodiment, a finger sensing structure for a capacitive fingerprint recognition IC comprises a plurality of sensing electrodes, a capacitive sensing layer, a functional metal layer, a common conductive layer, a signal processing circuit, an insulating layer, and a protecting layer. The plurality of sensing electrodes form an array to define a sensing area; the capacitive sensing layer covers the plurality of sensing electrodes; the functional metal layer disposes on the capacitive sensing layer and includes a plurality of fishbone-like structures, the plurality of fishbone-like structures are distributed between gaps or distributed in peripheries of the plurality of sensing electrodes, wherein the functional metal layer comprises a finger sensing metal unit and an electrostatic damage (ESD) protecting metal unit, and the finger sensing metal unit and the ESD protecting metal unit comprise part of the plurality of fishbone-like structures, respectively; the common conductive layer connects to the plurality of fishbone-like structures and surrounds the sensing area to transfer signals, wherein the common conductive layer comprises a finger sensing conductive unit and an ESD protecting conductive unit, which are electrical insulated to each other, and the plurality of fishbone-like structures of the finger sensing metal unit and that of the ESD protecting metal unit are electrical connected to the finger sensing conductive unit and the ESD protecting conductive unit, respectively; the signal processing circuit disposes under and electrical connects to the plurality of sensing electrodes; the insulating layer disposes between the plurality of sensing electrodes and the signal processing circuit; and the protecting layer covers the capacitive sensing layer and the functional metal layer. Each of the plurality of fishbone-like structures at least comprises a ridge; the ridge is alternately arranged with the plurality of sensing electrodes in a first direction of the array of the plurality of sensing electrodes, and the ridge is extended along a second direction, which is perpendicular to the first direction of the array of the plurality of sensing electrodes; and at least one end of the ridge of the finger sensing metal unit and the ridge of the ESD protecting metal unit is connected to the finger sensing conductive unit and the ESD protecting conductive unit.

According to further another embodiment of the present invention, a structure of finger sensing device of a capacitive fingerprint recognition IC comprises a plurality of sensing electrodes, a finger sensing metal layer, a capacitive sensing layer, a common conducted layer, a signal processing circuit, an insulating layer and a protecting layer. The plurality of sensing electrodes forms an array for define a sensing area; a finger sensing metal layer is coplanarly disposed with the plurality of sensing electrodes and has a plurality fishbone-like structures, wherein the plurality fishbone-like structures are distributed between gaps of the plurality of sensing electrodes or distributed in peripheries of the plurality of sensing electrodes; a capacitive sensing layer covers the plurality of sensing electrodes and the finger sensing metal layer; the commend conductive layer connects to the plurality of sensing electrodes and surrounds the sensing area to transfer signal; the signal processing circuit disposes under and electrical connects to the plurality of sensing electrodes; the insulating layer disposes between the plurality of sensing electrodes and the signal processing circuit; and protecting layer covers the capacitive sensing layer. Each of the fishbone-like structure at least comprises a ridge; the ridge is alternately arranged with the plurality of sensing electrodes in a first direction of the array of the plurality of sensing electrodes, and the ridge is extended along a second direction, which is perpendicular to the first direction of the array of the plurality of sensing electrodes; and at least one end of the ridge connects to the common conductive layer.

According to yet another embodiment of the present invention, a structure of finger sensing device of a capacitive fingerprint recognition IC comprises a plurality of sensing electrodes, a functional metal layer, a capacitive sensing layer, a common conductive layer, a signal processing circuit, an insulating layer, and a protecting layer. The plurality of sensing electrodes form an array to define a sensing area; the functional metal layer is coplanarly disposed with the plurality of sensing electrodes and includes a plurality of fishbone-like structures, the plurality of fishbone-like structures are distributed between gaps of the plurality of sensing electrodes or distributed in peripheries of the plurality of sensing electrodes, wherein the functional metal layer comprises a finger sensing metal unit and an ESD protecting metal unit, and the finger sensing metal unit and the ESD protecting metal unit comprise part of the plurality of fishbone-like structures, respectively; the capacitive sensing layer covers the plurality of sensing electrodes and the functional metal layer; the common conductive layer connects to the plurality of fishbone-like structures and surrounds the sensing area to transfer signals, wherein the common conductive layer comprises a finger sensing conductive unit and an ESD protecting conductive unit electrical, which are insulated to each other, and the plurality of fishbone-like structures of the finger sensing metal unit and that of the ESD protecting metal unit electrical connect to the finger sensing conductive unit and the ESD protecting conductive unit, respectively; the signal processing circuit disposes under and electrical connects to the plurality of sensing electrodes; the insulating layer disposes between the plurality of sensing electrodes and the signal processing circuit; and the protecting layer covers the capacitive sensing layer. Each of the plurality of fishbone-like structures at least comprises a ridge; the ridge is alternately arranged with the plurality of sensing electrodes in a first direction of the array of the plurality of sensing electrodes, and the ridge is extended along a second direction, which is perpendicular to the first direction of the array of the plurality of sensing electrodes; and at least one end of the ridge of the finger sensing metal unit and the ridge of the ESD protecting metal unit is connected to the finger sensing conductive unit and the ESD protecting conductive unit.

The purpose, technical content, characteristic and effect of the present invention will be easy to understand by reference to the following detailed descriptions, when taken in conjunction with the accompanying drawings and the particular embodiment.

DESCRIPTION OF THE PREFERRED EMBODIMENT

Figure 1:
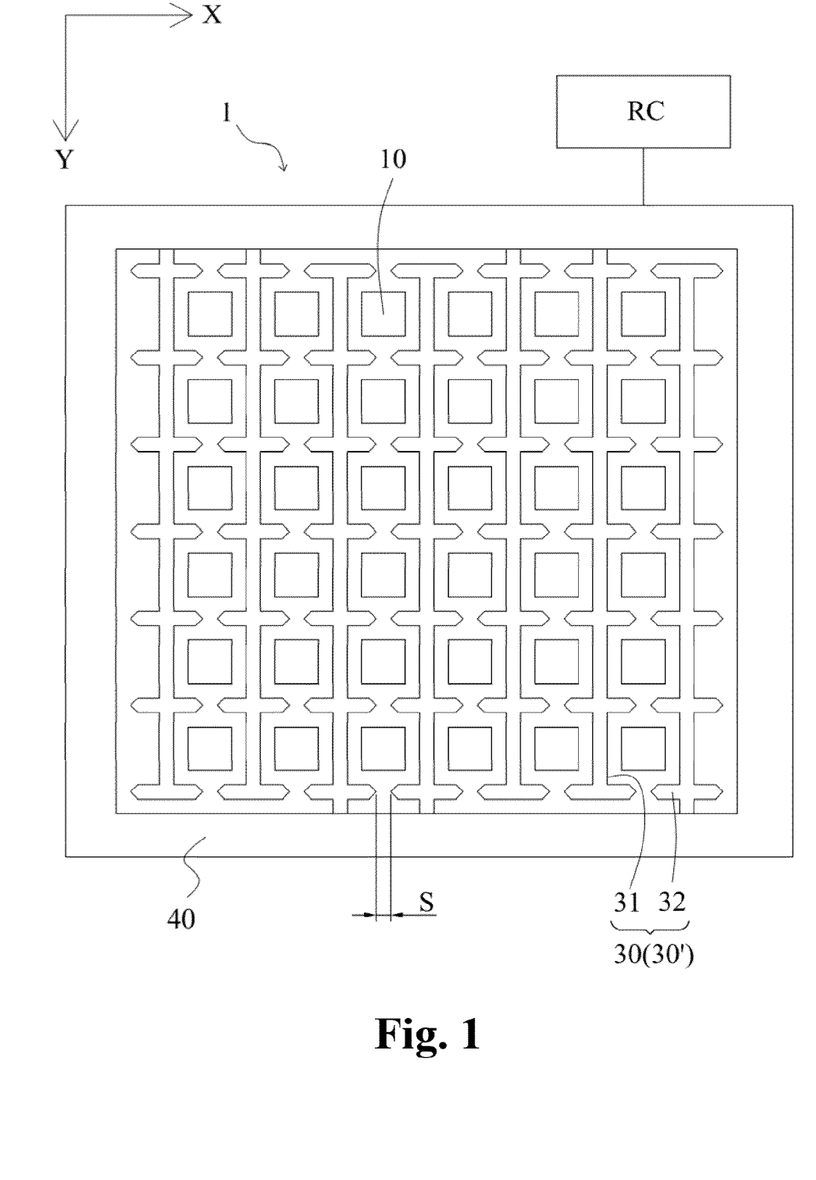
FIG. 1 is a schematic plan view of the structure of finger sensing device of a capacitive fingerprint recognition integrated circuit (IC) according to an embodiment of the present invention.
Figure 2A:
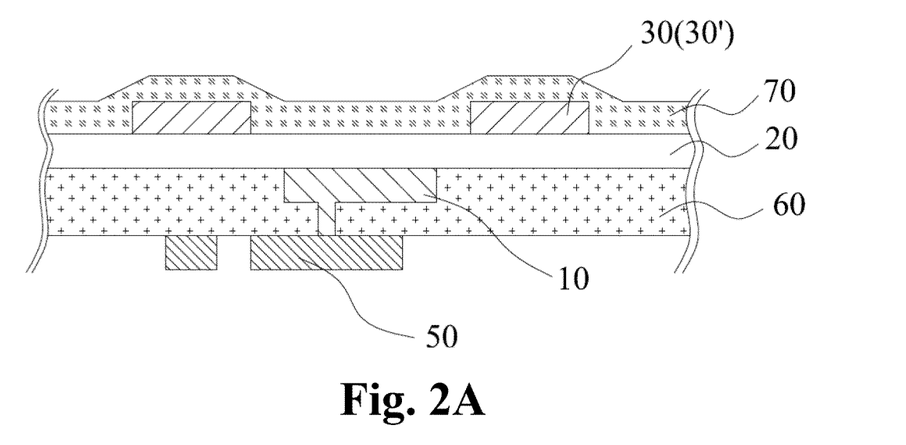
FIG. 2A is a sectional side view of the structure of finger sensing device of a capacitive fingerprint recognition IC according to an embodiment of the present invention.
Figure 4A:
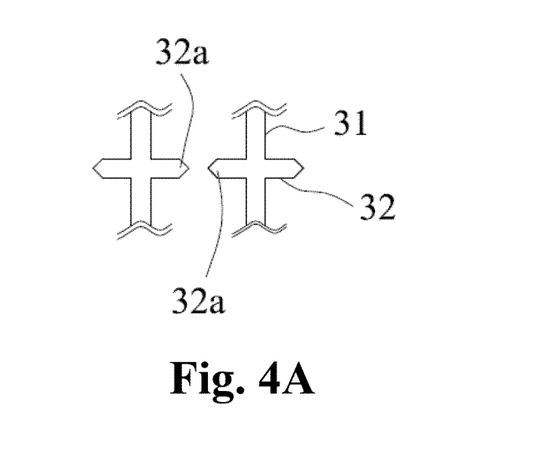
FIG. 4A is a schematic view of the ridge of the fishbone-like structure, wherein the ridge comprises a sharp shaped end.
Figure 4B:
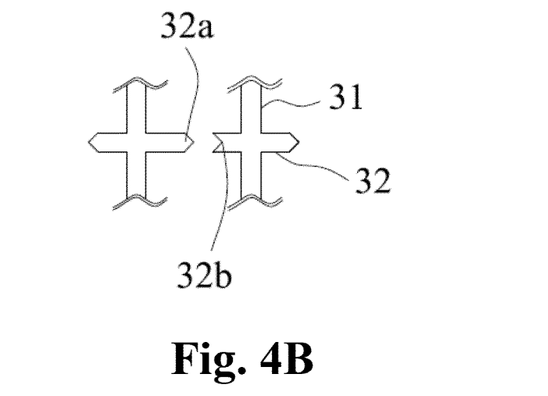
FIG. 4B is a schematic view of the ridge of the fishbone-like structure, wherein the ridge comprises a sharp shaped end and a concave shaped end.
Figure 4C:
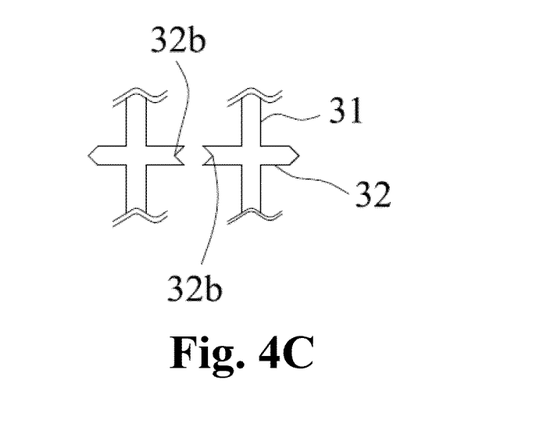
FIG. 4C is a schematic view of the ridge of the fishbone-like structure, wherein the ridge comprises a concave shaped end.

Refers to both of FIGS. 1 and 2A, FIG. 1 is a schematic plan view of the finger sensing structure for a capacitive fingerprint recognition integrated circuit (IC) 1 according to an embodiment of the present invention, FIG. 2A is a sectional side view of the structure of finger sensing structure for a capacitive fingerprint recognition IC 1 according to an embodiment of the present invention, and the first embodiment of the present invention is described herein by FIGS. 1 and 2A. In the first embodiment, the finger sensing structure for capacitive fingerprint recognition IC 1 comprises a plurality of sensing electrodes 10, a capacitive sensing layer 20, a finger sensing metal layer 30, a common conductive layer 40, a signal processing circuit 50, an insulating layer 60 and a protecting layer 70. The plurality of sensing electrodes 10 may be implemented in an array configuration to define a sensing area; the capacitive sensing layer 20 covers the plurality of sensing electrodes 10; the finger sensing metal layer 30 disposes on the capacitive sensing layer 20 and includes a plurality of fishbone-like structures, wherein those of fishbone-like structures are distributed between gaps of those sensing electrodes 10 or in peripheries of those sensing electrodes 10; the common conductive layer connects to the plurality of fishbone-like structures and surrounds the sensing area to transfer the signal; the signal processing circuit 50 disposes under and electrical connects to the sensing electrode 10; the insulating layer 60 disposes between the sensing electrode 10 and the signal processing circuit 50; the protecting layer 70 covers the capacitive sensing layer 20 and the finger sensing metal layer 30. Each of the fishbone-like structure at least comprises a ridge 31; the ridge 31 is alternately arranged with the sensing electrodes 10 in a first direction X of the array of the sensing electrodes 10, and the ridge 31 is extended along a second direction Y, which is perpendicular to the first direction X of the array of the sensing electrodes 10; and at least one end of the ridge 31 is connected to the common conductive layer 40. In an embodiment, each of the fishbone-like structure further comprises a rib 32, the rib 32 is extended in the first direction X along two sides of the ridge 31 and alternately arranged with the sensing electrodes 10 in the second direction Y; end of the rib is formed as at least one of a sharp shaped end 32a (as shown in FIGS. 4A and 4B) and a concave shaped end 32b (as shown in FIGS. 4B and 4C). For example, the ends of rib 32 may be, but not limited to, sharp shaped ends 32a faced to each other (as shown as FIG. 4A), or a sharp shaped end 32a and a concave shaped end 32b faced to each (as shown as FIG. 4B), or concave shaped ends 32b faced to each other (as shown as FIG. 4C). A gap S is formed between the ends of the rib 32 of the ridges 31 adjacent to each other. It is noted that the rib 32 is not necessary, and the fishbone-like structure may only comprises the ridge 31. The drawings are used for illustration but not for the limitation of the present invention, as well as for the described embodiments hereinafter.

Refers to FIG. 1, in an embodiment, the common conductive layer 40 and the finger sensing metal layer 30 are electrical connected to a resistor-capacitor circuit RC (RC circuit) to detect the potential changes of the finger sensing metal layer 30, so as to turn on the fingerprint recognition IC. The resistor-capacitor circuit RC may be an external or embedded circuit, and the operating principle thereof are briefly described as follows: the resistor-capacitor circuit RC comprises a fixed capacity $C_f$ (not shown), when fingers (or other objects) approach or touch the sensing electrode 10, a finger capacity $C_d$ (not shown) generates due to the approaching and the contact of the fingers; when $C_f$ and $C_d$ connected in parallel, the capacity and the charging time are increased, and the signal delay is generated. The change of the voltage of the common conductive layer 40 may be obtained by detecting the signal delay, if the voltage is lower than a threshold value, the fingerprint recognition IC is turned on; otherwise the fingerprint recognition IC is turned off. Therefore, it is automatic to detect whether the fingers are approaching or contact, so as to achieve the effect of startup or sleep without turned on the IC at any time to save power.

Wherein, the vertical positions of the common conductive layer 40 and finger sensing metal layer 30 are not limited. In an embodiment, the common conductive layer 40 and finger sensing metal layer 30 may be located at the same plane. In another embodiment, the common conductive layer 40 and finger sensing metal layer 30 may be located at different planes.

In further embodiment, the capacitive sensing layer 20 (as shown in FIG. 2A) is made by deposition of silicon oxynitride or made by alternately stacked deposition of silicon nitride and silicon oxide.

Figure 3:
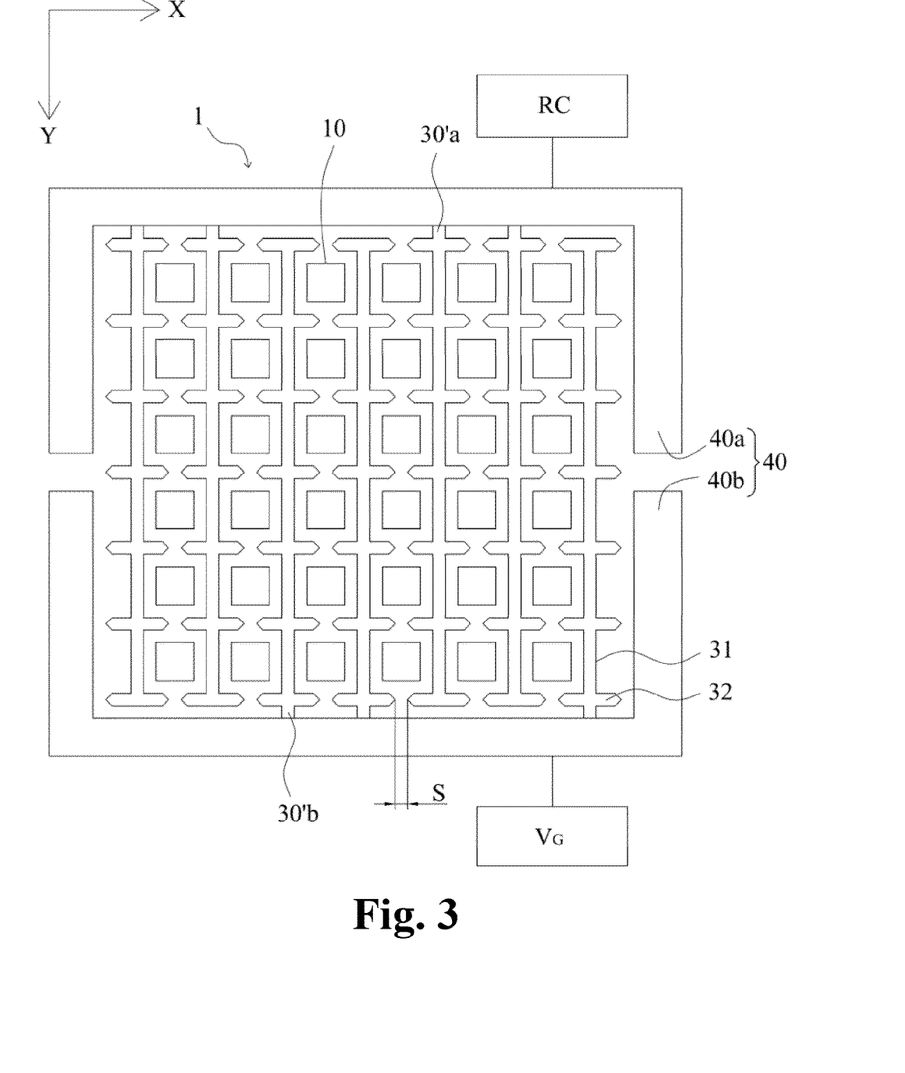
FIG. 3 is a schematic plan view of the structure of finger sensing device of a capacitive fingerprint recognition IC according to another embodiment of the present invention.

Refers to both of FIGS. 3 and 2A, FIG. 3 is a schematic plan view of the finger sensing structure for a capacitive fingerprint recognition IC according to another embodiment of the present invention, and the second embodiment of the present invention is described herein by FIGS. 3 and 2A. In the second embodiment, the finger sensing structure for a capacitive fingerprint recognition IC 1 comprises a plurality of sensing electrodes 10, a capacitive sensing layer 20, a functional metal layer 30', a common conductive layer 40, a signal processing circuit 50, an insulating layer 60 and a protecting layer 70. The plurality of sensing electrodes 10 may be implemented in an array configuration to define a sensing area; the capacitive sensing layer 20 covers the plurality of sensing electrodes 10; the functional metal layer 30' disposes on the capacitive sensing layer 20 and includes a plurality of fishbone-like structures, the plurality of fishbone-like structures are distributed between gaps of those sensing electrodes or in peripheries of those sensing electrodes, wherein the functional metal layer 30' comprises a finger sensing metal unit 30'a and an electrostatic damage (ESD) protecting metal unit 30'b, and the finger sensing metal unit 30'a and the ESD protecting metal unit 30'b comprise part of the plurality of fishbone-like structures, respectively; a common conductive layer 40 connects to the plurality of fishbone-like structures and surrounds the sensing area to transfer signals, wherein the common conductive layer 40 comprises a finger sensing conductive unit 40a and an ESD protecting conductive unit 40b, which are electrical insulated to each other, and the plurality of fishbone-like structures of the finger sensing metal unit 30'a and that of the ESD protecting metal unit 30'b are electrical connected to the finger sensing conductive unit 40a and the ESD protecting conductive unit 40b, respectively; the signal processing circuit 50 disposes under and electrical connects to the plurality of sensing electrodes 10; the insulating layer 60 disposes between the plurality of sensing electrodes 10 and the signal processing circuit 50; and the protecting layer 70 covers the capacitive sensing layer 20 and the functional metal layer 30'. Each of the plurality of fishbone-like structures at least comprises a ridge 31; the ridge 31 is alternately arranged with the plurality of sensing electrodes 10 in a first direction X of the array of the plurality of sensing electrodes 10, and the ridge 31 is extended along a second direction Y, which is perpendicular to the first direction X of the array of the plurality of sensing electrodes 10; at least one end of the ridge 31 of the finger sensing metal unit 30'a and the ridge 31 of the ESD protecting metal unit 30'b is connected to the finger sensing conductive unit 40a and the ESD protecting conductive unit 40b. In an embodiment, each of fishbone-like structures further comprises a rib 32, the rib 32 is extended in the first direction X along two sides of the ridge 31 and alternately arranged with the sensing electrodes 10 in the second direction Y; end of the rib 32 is formed as at least one of a sharp shaped end 32a (as shown in FIGS. 4A and 4B) and a concave shaped end (as shown in FIGS. 4B and 4C), for example, the ends of rib 32 may be, but not limited to, sharp shaped ends 32a faced to each other (as shown as FIG. 4A), or a sharp shaped end 32a and a concave shaped end 32b faced to each (as shown as FIG. 4B), or concave shaped ends 32b faced to each other (as shown as FIG. 4C). A gap S is formed between the ends of the rib 32 of the ridges 31 adjacent to each other.

According to the described above, the different of the first embodiment and the second embodiment is that the functional metal layer 30' of the second embodiment further comprises the ESD protecting metal unit 30'b and the ESD protecting conductive unit 40b except the finger sensing metal unit 30'a. Therefore, the second embodiment comprises not only the major function of automatically awake and startup, but also the advantages of static electricity protection that the electrostatic charge of the fingers (or the contactants) may be exported.

Wherein, the vertical positions of the common conductive layer 40 and the functional metal layer 30' are not limited. In an embodiment, the common conductive layer 40 and the functional metal layer 30' may be located at the same plane. In another embodiment, the common conductive layer 40 and the functional metal layer 30' may be located at different planes.

In further another embodiment, the finger sensing conductive unit 40a of the common conductive layer 40 and the finger sensing metal unit 30'a are electrical connect to a resistor-capacitor circuit RC (as shown in FIG. 3). The principle of the resistor-capacitor circuit RC is the same as aforementioned and the repeated descriptions are omitted.

In yet another embodiment, the ESD protecting conductive unit 40b of the common conductive layer 40 and the ESD protecting metal unit 30'b are electrical connected to an external ground voltage VG (as shown in FIG. 3) to export redundant or accumulated electrostatic charge, such that the damage of the fingerprint recognition IC generated by static electricity may be prevented.

In still another embodiment, the capacitive sensing layer 20 (as shown in FIG. 2A) is made by deposition of silicon oxynitride or made by alternately stacked deposition of silicon nitride and silicon oxide.

Figure 2B:
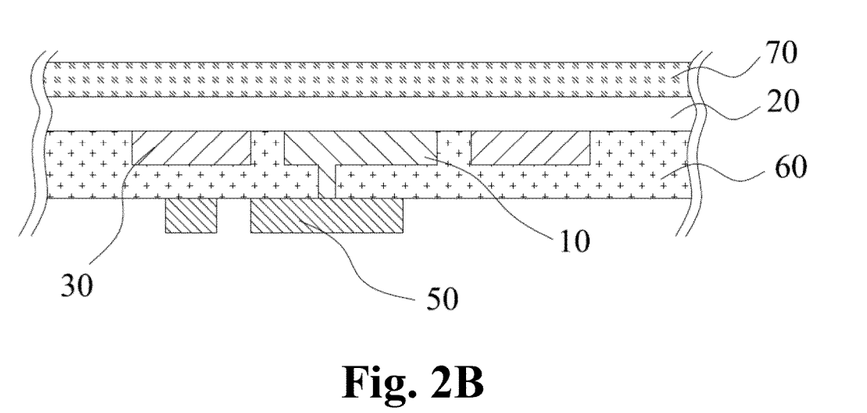
FIG. 2B is a sectional side view of the structure of finger sensing device of a capacitive fingerprint recognition IC according to another embodiment of the present invention.

In addition, the relative position of the sensing electrode 10 and finger sensing metal layer 30 (or functional metal layer 30') may be modified according to the requirement of the user or manufacturing process. Refers to FIGS. 1 and 2B, FIG. 2B is a sectional side view of the structure of finger sensing device of a capacitive fingerprint recognition IC 1 according to another embodiment of the present invention. The third embodiment of the present invention is described herein by FIGS. 1 and 2B. In the third embodiment, the finger sensing structure for a capacitive fingerprint recognition IC 1 comprises a plurality of sensing electrodes 10, a finger sensing metal layer 30, a capacitive sensing layer 20, a common conductive layer 40, a signal processing circuit 50, an insulating layer 60 and a protecting layer 70. The plurality of sensing electrodes 10 form an array to define a sensing area; the finger sensing metal layer 30 is coplanarly disposed with the plurality of sensing electrodes 10 and comprises a plurality of fishbone-like structures, wherein those fishbone-like structures are distributed between gaps of those sensing electrodes 10 or in peripheries of those sensing electrodes 10; the capacitive sensing layer 20 covers the plurality of sensing electrodes 10 and the finger sensing metal layer 30; the common conductive layer 40 connects to the plurality of fishbone-like structures and surrounds the sensing area to transfer the signal; the signal processing circuit 50 disposes under and electrical connects to the sensing electrode 10; the insulating layer 60 disposes between the sensing electrode 10 and the signal processing circuit 50; the protecting layer 70 covers the capacitive sensing layer 20. Each of the fishbone-like structure at least comprises a ridge 31; the ridge 31 is alternately arranged with the sensing electrodes 10 in a first direction X of the array of the sensing electrodes 10, and the ridge 31 is extended along a second direction Y, which is perpendicular to the first direction X of the array of the sensing electrodes 10; and at least one end of the ridge 31 is connected to the common conductive layer 40. In an embodiment, each of the fishbone-like structure further comprises a rib 32, the rib 32 is extended in the first direction X along two sides of the ridge 31 and alternately arranged with the sensing electrodes in the second direction Y; end of the rib 32 is formed as at least one of a sharp shaped end 32a (as shown in FIGS. 4A and 4B) and a concave shaped end 32b (as shown in FIGS. 4B and 4C). For example, the ends of rib 32 may be, but not limited to, sharp shaped ends 32a faced to each other (as shown as FIG. 4A), or a sharp shaped end 32a and a concave shaped end 32b faced to each (as shown as FIG. 4B), or concave shaped ends 32b faced to each other (as shown as FIG. 4C). A gap S is formed between the ends of the rib 32 of the ridges 31 adjacent to each other.

As described above, the different of the first embodiment and the third embodiment is that the finger sensing metal layer 30 and the sensing electrodes 10 of the first embodiment are disposed at different planes, and the finger sensing metal layer and the sensing electrodes 10 of the third embodiment are located at the same plane.

Besides, refers to both of FIGS. 3 and 2B, the technical feature of static electricity protection may be added according to the third embodiment, and the fourth embodiment of the present invention is described herein by FIGS. 3 and 2B. In the fourth embodiment, the finger sensing structure for a capacitive fingerprint recognition IC 1 comprises a plurality of sensing electrodes 10, a functional metal layer 30', a capacitive sensing layer 20, a common conductive layer 40, a signal processing circuit 50, an insulating layer 60 and a protecting layer 70. The plurality of sensing electrodes 10 form an array to define a sensing area; the functional metal layer 30' is coplanarly disposed with the plurality of sensing electrodes 10 and comprises a plurality of fishbone-like structures, the plurality of fishbone-like structures are set between gaps of those sensing electrodes 10 or set in peripheries of those sensing electrodes 10, wherein the functional metal 30' comprises a finger sensing metal unit 30'a and an ESD protecting metal unit 30'b, and the finger sensing metal unit 30'a and the ESD protecting metal unit 30'b comprise part of the plurality of fishbone-like structures, respectively; the capacitive sensing layer 20 covers the plurality of sensing electrodes 10 and the functional metal layer 30'; the common conductive layer 40 connects to the plurality of fishbone-like structures and surrounds the sensing area to transfer the signal, wherein the common conductive layer 40 comprises a finger sensing conductive unit 40 a and a ESD protecting conductive unit 40b, which are electrical insulated to each other, and the plurality of fishbone-like structures of the finger sensing metal unit 30'a and that of the ESD protecting metal 30'b are electrical connected to the finger sensing conductive unit 40a and the ESD protecting conductive unit 40b, respectively; the signal processing circuit 50 disposes under and electrical connects to the sensing electrode 10; the insulating layer 60 disposes between the sensing electrode 10 and the signal processing circuit 50; and the protecting layer 70 covers the capacitive sensing layer 20. Each of the fishbone-like structure at least comprises a ridge 31; the ridge 31 is alternately arranged with the sensing electrodes 10 in a first direction X of the array of the sensing electrodes 10, and the ridge 31 is extended along a second direction Y, which is perpendicular to the first direction X of the array of the sensing electrodes 10; and at least one of the ridge 31 of the finger sensing metal unit 30'a and the ridge 31 of the ESD protecting metal unit 30'b is connected to the finger sensing conductive unit 40a and ESD protecting conductive unit 40b. In an embodiment, each of the fishbone-like structure further comprises a rib 32, the rib 32 is extended in the first direction X along two sides of the ridge 31 and alternately arranged with the sensing electrodes in the second direction Y; end of the rib 32 is formed as at least one of a sharp shaped end 32a (as shown in FIGS. 4A and 4B) and a concave shaped end 32b (as shown in FIGS. 4B and 4C). For example, the ends of rib 32 may be, but not limited to, sharp shaped ends 32a faced to each other (as shown as FIG. 4A), or a sharp shaped end 32a and a concave shaped end 32b faced to each (as shown as FIG. 4B), or concave shaped ends 32b faced to each other (as shown as FIG. 4C). A gap S is formed between the ends of the rib 32 of the ridges 31 adjacent to each other.

As described above, the different of the second embodiment and the fourth embodiment is that the functional metal layer 30' and sensing electrode 10 of the second embodiment are disposed at different planes (as shown in FIG. 2A), and the functional metal layer 30' and sensing electrode 10 of the fourth embodiment are located at the same plane (as shown in FIG. 213).

The other technical features of the third and the fourth embodiments are similar to that of the first and second embodiments, so as the repeated description are omitted.

Figure 5A:
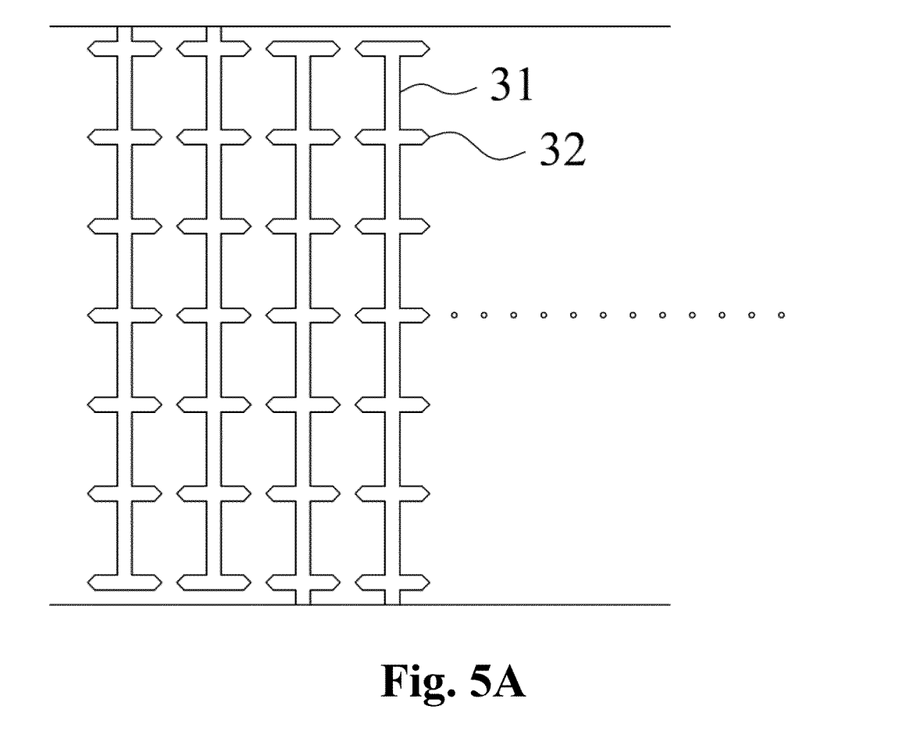
FIGS. 5A, 5B, 5C and 5D are schematic arrangement views of the fishbone-like structure according to different embodiments of the present invention.
Figure 5B:
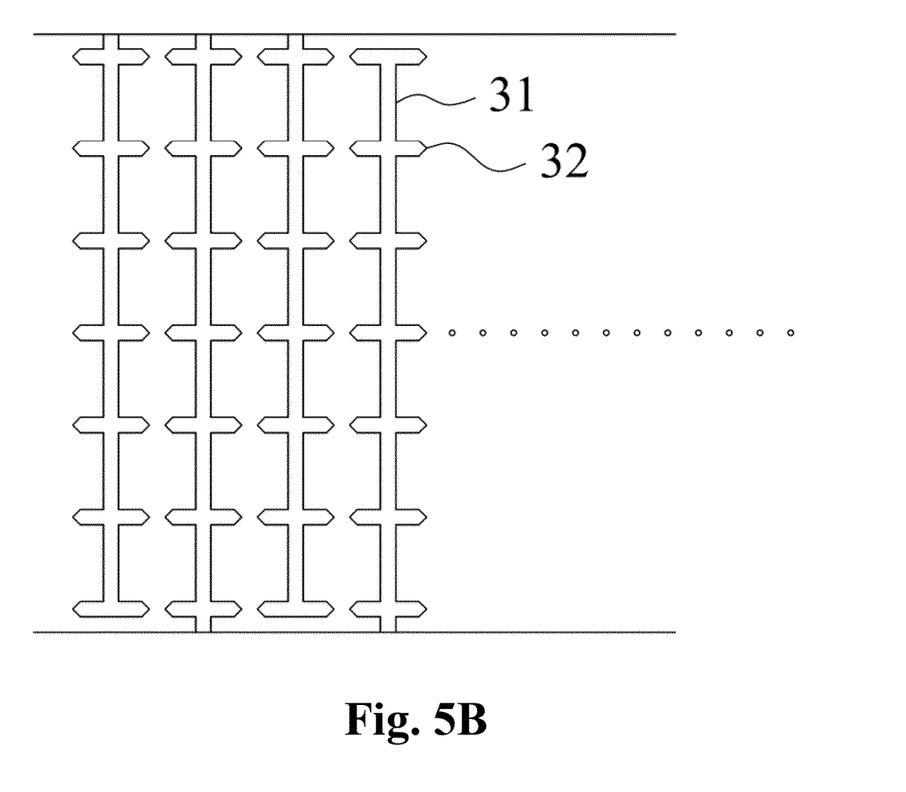
Figure 5C:
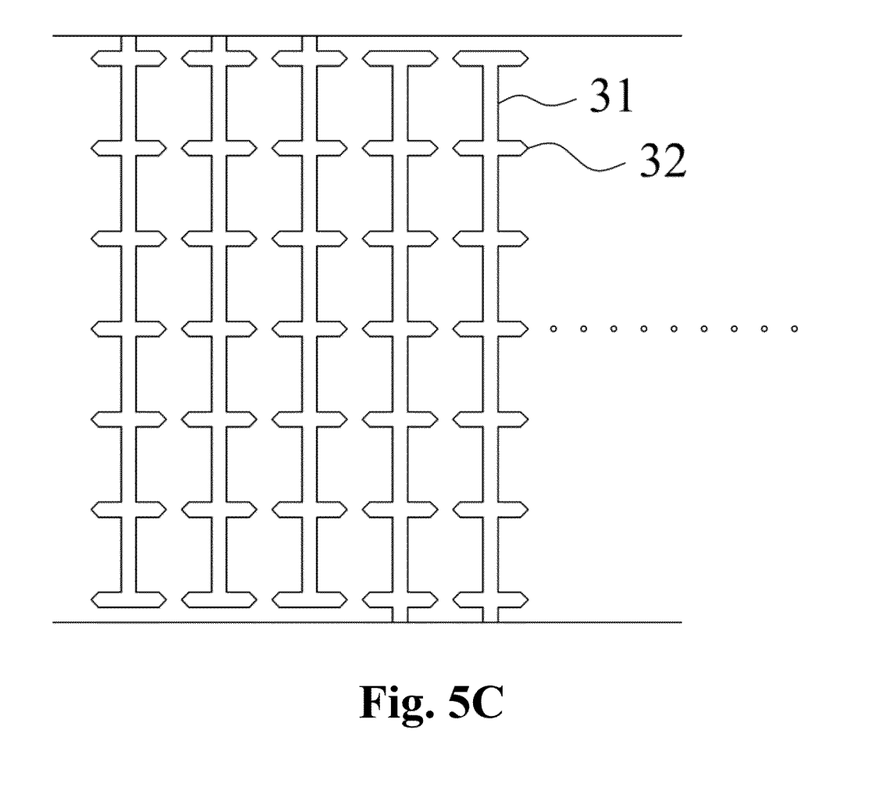
Figure 5D:
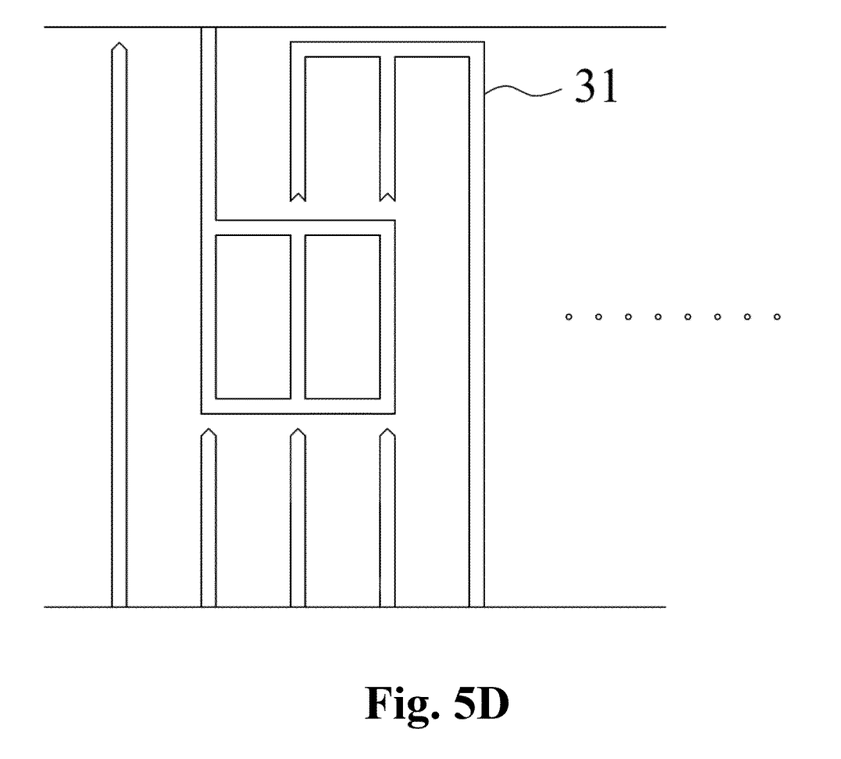

In addition, the arrangement of the plurality of fishbone-like structures as shown in FIGS. 1 and 3 are only an embodiment, there may have different arrangements. As shown in FIG. 5A, it is a schematic arrangement view according to the fishbone-like structures of FIGS. 1 and 3 (comprising ridge 31 and rib 32); FIGS. 5B and 5C are the other arrangements of the fishbone-like structures (comprising ridge 31 and rib 32). The fishbone-like structures in FIG. 5D only comprise ridge 31 and are arranged irregularly. The fishbone-like structures have no invariant aspects, and may be modified base on user's requirement.

In summary, the structure of a finger sensing device of a capacitive fingerprint recognition IC of the present invention comprises a finger sensing metal layer with fish bone shape.

When fingers approach or touch the surface of the capacitive fingerprint recognition IC, capacitive sense is induced between the fingers and the metal patterned layer to wake up the IC. Before the fingers approach or touch the IC, the IC is hibernated; once the fingers are detected, the IC is woken up. The metal patterned layer can reduce energy consumption of the IC, especially for portable fingerprint recognition IC.

The embodiments as above only illustrate the technical concepts and characteristics of the present invention; it is purposed for person ordinary skill in the art to understand and implement the present invention, but not for the limitation to claims of the present invention. That is, any equivalent change or modification in accordance with the spirit of the present invention should be covered by the appended claims.

What is claimed is:

1. A finger sensing structure for a capacitive fingerprint recognition IC, comprising:
    a plurality of sensing electrodes, formed an array to define a sensing area;
    a capacitive sensing layer, covered the plurality of sensing electrodes;
    a functional metal layer, disposed on a upper surface and a lower surface of the capacitive sensing layer and included a plurality of fishbone-like structures, wherein the plurality of fishbone-like structures are distributed between gaps of the plurality of sensing electrodes or distributed in peripheries of the plurality of sensing electrodes, wherein the functional metal layer comprises a finger sensing metal unit and an ESD protecting metal unit, and the finger sensing metal unit and the ESD protecting metal unit comprise part of the plurality of fishbone-like structures, respectively;
    a common conductive layer, connected to the plurality of fishbone-like structures and surrounded the sensing area to transfer signals, wherein the common conductive layer comprises a finger sensing conductive unit and an ESD protecting conductive unit, which are electrical insulated to each other, and the plurality of fishbone-like structures of the finger sensing metal unit and the plurality of fishbone-like structures of the ESD protecting metal unit are electrical connected to the finger sensing conductive unit and the ESD protecting conductive unit, respectively;
    a signal processing circuit, disposed under and electrical connected to the plurality of sensing electrodes;
    an insulating layer, disposed between the plurality of sensing electrodes and the signal processing circuit; and
    a protecting layer, covered the upper surface of the capacitive sensing layer, wherein
        each of the plurality of fishbone-like structures at least comprises a ridge;
        the ridge is alternately arranged with the plurality of sensing electrodes in a first direction of the array of the plurality of sensing electrodes, the ridge is extended along a second direction, which is perpendicular to the first direction of the array of the plurality of sensing electrodes; and
        at least one end of the ridge of the finger sensing metal unit and the ridge of the ESD protecting metal unit is connected to the finger sensing conductive unit and the ESD protecting conductive unit.

2. The finger sensing structure for a capacitive fingerprint recognition IC as claimed in claim 1, wherein the plurality of fishbone-like structures further comprise a rib, wherein
    the rib is extended in the first direction along two sides of the ridge and alternately arranged with the plurality of sensing electrodes in the second direction;
    ends of the rib are formed as at least one of a sharp shaped end or a concave shaped end; and
    a gap is formed between the ends of the rib of the ridge adjacent to each other.

3. The finger sensing structure for a capacitive fingerprint recognition IC as claimed in claim 1, wherein the common conductive layer and the functional metal layer are located at the same plane.

4. The finger sensing structure for a capacitive fingerprint recognition IC as claimed in claim 1, wherein the finger sensing conductive unit of the common conductive layer and the finger sensing metal unit are electrical connected to a resistor-capacitor circuit (RC circuit).

5. The finger sensing structure for a capacitive fingerprint recognition IC as claimed in claim 1, wherein the ESD protecting conductive layer of the common conductive layer and the ESD protecting metal unit are electrical connected to an external ground voltage.

6. The finger sensing structure for a capacitive fingerprint recognition IC as claimed in claim 1, wherein the capacitive sensing layer is made by deposition of silicon oxynitride or made by alternately stacked deposition of silicon nitride and silicon oxide.

7. The finger sensing structure for a capacitive fingerprint recognition IC as claimed in claim 1, wherein the functional metal layer is disposed on the upper surface of the capacitive sensing layer, and the protecting layer is covered on the capacitive sensing layer and the functional metal layer.

8. The finger sensing structure for a capacitive fingerprint recognition IC as claimed in claim 1, wherein the functional metal layer is disposed on the lower surface of the capacitive sensing layer, and coplanarly disposed with the plurality of sensing electrodes.

* * * * *